(12) United States Patent
Potkonjak

(10) Patent No.: US 9,104,435 B2
(45) Date of Patent: Aug. 11, 2015

(54) PROGRAM AND DATA ANNOTATION FOR HARDWARE CUSTOMIZATION AND ENERGY OPTIMIZATION

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 723 days.

(21) Appl. No.: 12/423,374

(22) Filed: Apr. 14, 2009

(65) Prior Publication Data

US 2010/0262779 A1 Oct. 14, 2010

(51) Int. Cl.
- *G06F 15/00* (2006.01)
- *G06F 7/38* (2006.01)
- *G06F 9/00* (2006.01)
- *G06F 9/44* (2006.01)
- *G06F 9/45* (2006.01)

(52) U.S. Cl.
CPC ............. *G06F 8/4432* (2013.01); *Y02B 60/181* (2013.01)

(58) Field of Classification Search
None
See application file for complete search history.

(56) References Cited

U.S. PATENT DOCUMENTS

| | | | |
|---|---|---|---|
| 6,353,925 B1 | 3/2002 | Stata et al. | |
| 6,427,234 B1* | 7/2002 | Chambers et al. | 717/140 |
| 7,506,329 B1* | 3/2009 | Boucher | 717/151 |
| 2002/0059456 A1* | 5/2002 | Ha et al. | 709/246 |
| 2004/0010679 A1* | 1/2004 | Moritz et al. | 713/1 |
| 2004/0010782 A1* | 1/2004 | Moritz | 717/151 |
| 2005/0262307 A1 | 11/2005 | Chiang et al. | |
| 2006/0119393 A1* | 6/2006 | Hua et al. | 326/121 |
| 2007/0023878 A1* | 2/2007 | Burton | 257/675 |
| 2007/0174828 A1* | 7/2007 | O'Brien et al. | 717/151 |
| 2007/0260893 A1* | 11/2007 | Aguilar et al. | 713/300 |
| 2008/0059946 A1* | 3/2008 | Harding et al. | 717/106 |
| 2008/0270764 A1* | 10/2008 | McMillen et al. | 712/220 |

(Continued)

FOREIGN PATENT DOCUMENTS

| | | |
|---|---|---|
| JP | 03-286213 | 12/1991 |
| JP | 04-257928 | 9/1992 |
| JP | 09-022318 | 1/1997 |

(Continued)

OTHER PUBLICATIONS

Azevedo et al. (Architectural and Compiler Strategies for Dynamic Power Management in the COPPER Project, Aug. 2002, pp. 25-34).*

(Continued)

*Primary Examiner* — George Giroux
(74) *Attorney, Agent, or Firm* — Turk IP Law, LLC

(57) ABSTRACT

Technologies are generally described herein for supporting program and data annotation for hardware customization and energy optimization. A code block to be annotated may be examined and a hardware customization may be determined to support a specified quality of service level for executing the code block with reduced energy expenditure. Annotations may be determined as associated with the determined hardware customization. An annotation may be provided to indicate using the hardware customization while executing the code block. Examining the code block may include one or more of performing a symbolic analysis, performing an empirical observation of an execution of the code block, performing a statistical analysis, or any combination thereof. A data block to be annotated may also be examined. One or more additional annotations to be associated with the data block may be determined.

20 Claims, 4 Drawing Sheets

(56) References Cited

U.S. PATENT DOCUMENTS

| | | | |
|---|---|---|---|
| 2009/0019423 A1* | 1/2009 | Halter et al. | 717/114 |
| 2009/0199019 A1* | 8/2009 | Hongisto et al. | 713/300 |

FOREIGN PATENT DOCUMENTS

| | | |
|---|---|---|
| JP | 09-062418 | 3/1997 |
| JP | 09-185589 | 7/1997 |
| JP | 10-149237 | 6/1998 |
| JP | 11-316690 | 11/1999 |
| JP | 2003-280987 | 10/2003 |
| JP | 2004-318502 | 11/2004 |
| JP | 2005-327178 | 11/2005 |
| WO | 2004006078 A1 | 1/2004 |
| WO | 2004006095 A1 | 1/2004 |
| WO | WO 2004/006078 A1 | 1/2004 |
| WO | WO 2004/006095 A1 | 1/2004 |

OTHER PUBLICATIONS

Wang et al. (Using the Compiler to Improve Cache Replacement Decisions, Jan. 2003, pp. 199-208).*

Haghighat et al. (Symbolic Analysis for Parallelizing Compilers, 1999, pp. 1-42).*

Wang et al. (Applying Reflective Middleware Techniques to Optimize a QoS-enabled CORBA Component Model Implementation, published 2000, pp. 492-499).*

Azevedo et al., "Architectural and complier strategies for dynamic power management in the COPPER project," Jan. 18-19, 2001, Innovative Architecture for Future Generation High-Performance Process Ors and Systems, IEEE, pp. 25-33.

Unsal, et al., "Cool-Cache for Hot Multimedia," Dec. 1-5, 2001, Proceedings on the m34th ACM/IEEE International Symposium on Microarchitecture, pp. 274-283.

European Search Report dated Dec. 6, 2010 in European Application No. 10154705.7.

Aldrich et al., "Alias Annotations for Program Understanding" 2002, Object-Oriented Programming, Systems, Languages, and Applications, pp. 1-20.

Benini, et al., "Policy Optimization for Dynamic Power Management", Jun. 1999, IEEE Transactions on Computer-Aided Design of Integrated Circuits and Systems, 18 (6):813-833.

Brock et al., "Dynamic Power Management for Embedded Systems", Sep. 17-20, 2003, Proceedings of the IEEE International SOC Conference, 2003, Portland, Oregon, 4 pages.

Guyer et al., "An Annotation Language for Optimizing Software Libraries", Oct. 3-6, 1999, Proceedings of DSL'99: The $2^{nd}$ conference on Domain-Specific Languages, Austin, Texas, 15 pages.

Irani, et al., "Online Strategies for Dynamic Power Management in Systems with Multiple Power Saving States", Jul. 25, 2002, Special Issue on Power-Aware Embedded Computing, 22 pages.

Pawlak, "Spoon: Annotation-Driven Program Transformation—the AOP Case", Nov. 28-Dec. 2, 2005, Proceedings of the $1^{st}$ International Workshop on Aspect-Oriented Middleware Development (AOMD05), Grenoble, France, 6 pages.

Wong et al., "An On-line Approach for Power Minimization in QoS Sensitive Systems", Jan. 2003, IEEE/ACM Asia and South Pacific Design Automation Conference, 6 pages.

Wong et al., "Power Minimization in QoS Sensitive Systems", Jun. 2004, IEEE Transactions on Very Large Scale Integration (VLSI) Systems, 12(6):553-561.

JP Office Action dated Sep. 27, 2012 in JP Application No. 2010-024989.

English Translation of JP Office Action dated Sep. 27, 2012 in JP Application No. 2010-024989.

* cited by examiner

PROGRAM AND DATA ANNOTATION FOR HARDWARE CUSTOMIZATION AND ENERGY OPTIMIZATION

BACKGROUND

Program modules, data, and content may be delivered through wired or wireless systems to target systems. At a target system, programs may be executed, and data may be processed. Target systems may handle programs and data differently based upon aspects of the target system. A high-definition home theater system may render video quite differently than a mobile telephone handset. Various target systems may employ multiple processors, processing circuits, application specific circuits, or modules. Such target systems may also be reconfigurable with respect to their various circuits, modules, memories, or other associated resources. Proper configuration or operation of particular target systems may support significantly improved energy consumption at each specific target system. It is with respect to these considerations and others that the disclosure made herein is presented.

BRIEF DESCRIPTION OF THE FIGURES

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
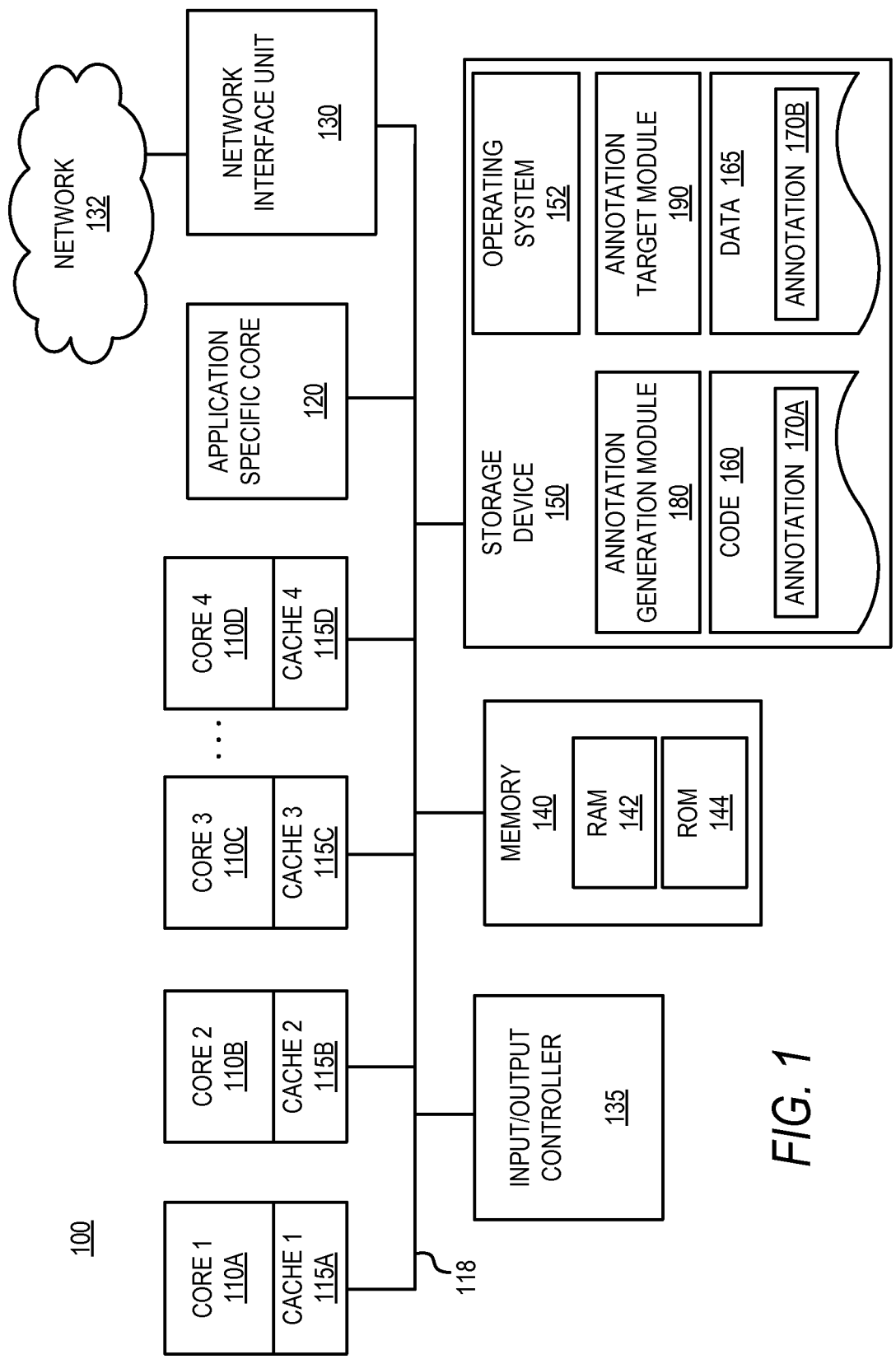
FIG. 1 is a block diagram illustrating a computer architecture and an environment operable to support program and data annotation for hardware customization and energy optimization.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following disclosure is drawn, inter alia, to methods, apparatus, systems, and computer program products related to technologies for program and data annotation for hardware customization and energy optimization. Through the use of the technologies and concepts presented herein, creation and dissemination of annotations can guide how a particular program should be executed in terms of software or hardware set-up. The annotations can support adaptive customization of computing systems using static or dynamic customization of applications, system software, or hardware. Such customization may influence how particular data is processed in terms of parameters such as bit-width, supply voltages, threshold voltages, and cache line replacement policies. The customization may be implemented to support a specified quality of service while reducing energy consumption. Referring now to the drawings, in which like numerals represent like elements through the several figures, aspects of annotation for hardware customization and energy optimization are described.

Technologies are generally described herein for supporting program and data annotation for hardware customization and energy optimization. A code block to be annotated may be examined. A hardware customization may be determined to support a specified quality of service level for executing the code block with reduced energy expenditure. One or more annotations may be determined. These annotations may be associated with the determined hardware customization. One of the annotations to a target system may be provided to indicate using the hardware customization while executing the code block. A data block to be annotated may be examined. One or more additional annotations to be associated with the data block may be determined.

Examples of hardware customization may include, among other examples, specifying a particular processor core within a multiprocessor, specifying a cache replacement policy, and gating of memory blocks. Examining the code block can include performing a symbolic analysis, performing an empirical observation of an execution of the code block, performing a statistical analysis, or any combination thereof.

FIG. 1 is a block diagram illustrating a computing architecture 100 and an environment operable to support program and data annotation for hardware customization and energy optimization, arranged in accordance with at least some embodiments of the present disclosure. The computing architecture 100 may include multiple processor cores, such as core 1 through core 4 110A-111D. These may be referred to collectively, or generally, as processor cores 110. The multiple processor cores 110 may generally support parallel processing, parallel tasks, parallel threads, separate sequential processes, or any combination thereof. The terms "multiprocessor" and "multi-core processor" may be used interchangeably herein with respect to a collection of processor cores 110 and associated circuitry. The computing architecture 100 may support any number of processing cores 110. The computing architecture 100 may alternatively include a single central processing unit (CPU).

In addition to the processor cores 110, the computing architecture 100 may support one or more digital signal processing (DSP) cores, or one or more application specific cores 120 for handling specialized functions such as video decoding, rendering graphics, communications operations, artificial neural networks, and so forth. The processor cores 110, the application specific core 120, and any other processing units within the computing architecture 100 may be implemented using discrete processors or microcontrollers, multiple cores integrated into a multiprocessor, or cores integrated into one or more application specific integrated circuits (ASICs), field programmable gate arrays (FPGAs), any other programmable logic device (PLD), system on chip, system on substrate, any other hardware integration technology, or any combination thereof.

A system bus 118 may interconnect the processor cores 110 of the computing architecture 100. The system bus 118 may also interconnect other elements of the computing architecture 100 to the processor cores 110. A memory 140 may couple to the system bus 118. The memory 140 may be accessed by the processor cores 110. The processor cores 110 may read from and write to the memory 140. Such reads and writes may relate to both instructions and data associated with operations of the multiple processor cores 110. The memory 140 may include random access memory 142 (RAM) and a read-only memory 144 (ROM). The memory 140 may include static RAM (SRAM), dynamic RAM (DRAM), synchronous DRAM (SDRAM), programmable ROM (PROM), erasable PROM (EPROM), electrically erasable PROM (EEPROM), flash memory, or any type of volatile or non-volatile memory.

Each of the multiple processor cores 110 may be associated with a cache, such as cache 1 through cache 4 115A-115D. These may be referred to collectively, or generally, as caches 115. A cache, such as one of the caches 115, can be a small, fast memory. The caches 115 can store frequently used, recently used, or soon to be used, blocks of memory for rapid access by one or more of the processor cores 110. The caches 115 may mitigate some of the latency associated with accessing the memory 140. While the caches 115 may be provided one to each processor core 110, a cache 115 may also be shared between two or more processor cores 110.

The computing architecture 100 may operate in a networked environment using logical connections to remote systems through a network 132. The computing architecture 100 may couple to the network 132 through a network interface unit 130. The network interface unit 130 may be coupled to the computing architecture 100 via the system bus 118. The network interface unit 130 may also be utilized to couple to other types of networks and remote computer systems. The computing architecture 100 may also include an input/output controller 135 for receiving and processing input from a number of other devices, including a keyboard, mouse, or electronic stylus (not illustrated). Similarly, the input/output controller 135 may provide output to a video display, a printer, or other type of output device (also not illustrated).

The computing architecture 100 may include a storage device 150 for storing an operating system 152, software, data, and various program modules, such as those associated with program and data annotation for hardware customization and energy optimization. Instructions and data associated with operations on the processor cores 110 may be stored on the storage device 150. The storage device 150 may include computer readable media supporting the nonvolatile storage of information. The storage device 150 may be accessed by the multiple processor cores 110. The storage device 150 can store software modules for execution on the processor cores 110 or the application specific core 120.

By way of example, and not limitation, the storage device 150 may comprise volatile, non-volatile, removable, and non-removable media implemented in any method or technology for the storage of information such as computer-readable instructions, data structures, program modules, or other data. For example, the storage device 150 and associated computer-readable media may include RAM, ROM, EPROM, EEPROM, flash memory, other solid state memory technology, CD-ROM, digital versatile disks (DVD), HD-DVD, BLU-RAY, other optical storage, magnetic cassettes, magnetic tape, magnetic disk storage, other magnetic storage devices, or any other medium which may be used to store information and which may be accessed by the computing architecture 100. The storage device 150 may be coupled to the system bus 118 through a storage controller (not illustrated).

A number of program modules and data files may be stored in the storage device 150 and the memory 140. These may include the operating system 152 suitable for controlling the operation of a desktop, laptop, server computer, embedded computing system, wireless computing device, or any other computing environment.

One or more examples of executable code 160 may also be stored in the storage device 150. The code 160 may include a code annotation 170A. Similarly, one or more examples of data 165 may be stored in association with the storage device 150. The data 165 may include a data annotation 170B. The code annotation 170A and the data annotation 170B are examples of annotations 170 that may be associated with code or data in a computing system that is arranged in accordance with the present disclosure. The annotations 170 may provide information supporting adaptive customization of the target computing system where the annotated code 160 will be executed or the annotated data 165 will be processed. The annotations 170 may also suggest how particular data 165 is processed, or code 160 is executed, in terms of certain system or environmental parameters.

System parameters associated with annotations 170 may include, as non-limiting examples, bit-width of data, supply voltages, threshold voltages, cache line replacement policies, and so forth. The annotations 170 and system parameters may support operation at a target computing system such that a specified quality of service (QoS) level may be maintained. The QoS level may be maintained even while energy consumption is reduced or minimized. Adaptive customization of a target computing system may involve branch prediction parameters, memory block gating, cache gating, block gating within ASICs, block gating within FPGAs, gating of processor cores 110, voltage settings, real-time constraints, coordinated execution, and manufacturing variability mitigation. Adaptive architectural techniques such as block gating and reconfigurable devices may leverage annotations 170 provided within code 160 or data 165.

An annotation generation module 180 may provide annotations 170 to blocks of code 160 or data 165, in accordance with the present disclosure. The annotations 170 may be calculated using symbolic analysis, observed execution, statistical evaluation, or any combination thereof. The generation of annotations 170 may occur on the same type of processor as the target for execution, or on another type of single or multiprocessor computing system. The annotations 170 may be calculated to ensure a specified quality of service (QoS) level. The QoS specification may be predetermined, provided by a user, or based on data or system parameters. Annotations 170 related to QoS levels may be specified using error norms, statistical measures of quality, or subjective criteria. While maintaining QoS specifications, other targeted objectives, such as energy consumption or memory footprint, may also be supported.

The annotations 170 may also include operational parameters for programmable processors, application specific cores, or FPGA components. The operational parameters associated with the annotations 170 may include various system configurations such as gating strategies, branch prediction policies, processor instructions, supply voltages, bias voltages, bit widths, functional units, and memory configurations. The annotations 170 may also specify how interconnect components, such as busses, may be configured.

Annotations 170 may also specify settings or configurations for system software such as operating systems 152, schedulers, memory management, device management, networking, compilers, loaders, and monitors. The annotations 170 may also specify which software is installed, how the software is configured, or how the software is executed.

Annotations 170 may also be compressed when created by the annotation generation module 180. The compression may support reduced energy and resource expenditure for the transmission or storage of the annotations 170. The annotations 170 may also be selectively applied to high impact parts of executed code 160, such as critical path operations or frequently repeated operations. Annotations 170 from one block of code 160 may be reused to provide the annotations 170 for another block of code 160 that performs a similar profile of computational tasks.

Once annotations 170 are provided by an annotation generation module 180, the annotations 170 may be distributed jointly with the associated code 160 or data 165. The annotations 170 may also be transmitted separately from the associated code 160 or data 165. The annotations may be transmitted to an annotation target module 190 where the annotations 170 are applied to the target system in accordance with the present disclosure. The target system may be the location for execution of the code 160, or where the data 165 is processed. For example, the bit resolution, bit rate, or color depth for graphic images or video may be adjusted according to provided annotations 170. Adjusting the bit allocation of the graphic images or video may support reducing energy consumption. The reduction in energy consumption may occur while maintaining a specified QoS level.

Annotations 170 may also indicate which processor cores 110 should execute which portions of code 160. The annotations 170 may also specify which branch predictor should be used within the processor cores 110. The annotations 170 may also specify gating actions for selectively enabling and disabling portions of processor cores 110, application specific cores 120 or other components of the computing architecture 100. For example, portions of the computing architecture 100 may have their power source gated off, clock source gated off, be held in reset, or be otherwise put into reduced power states while not needed by a portion of code 160 as indicated by the associated code annotation 170A. Supply voltages and threshold voltages may be also specified by the annotations. For example, in low demand portions of code 160 or reduced complexity portions of data 165, supply voltage to processor cores 110, application specific cores 120, or other components may be lowered to support reduced power consumption.

Annotations 170 may also indicate which application specific cores 120 should be used and when they should be used. This may involve gating off application specific cores 120 while not in use. This may also involve suggesting particular application specific cores 120 to certain portions of code 160 or data 165. Annotations 170 may also indicate memory parameters such as memory structures to be used, where in memory to store specific data 165, memory supply voltages, replacement policies for caches 115, and the organization of memory or storage scratch pads.

Other aspects of operation with in the computing architecture 100 may be specified by the annotations 170. For example, communication patterns of data between processor cores 110, between caches 115, or with respect to the network 132 may be suggested by the annotations 170. Specific media or content players may be suggested by the annotations 170. Particular thermal management strategies may also be suggested by the annotations 170.

Annotations 170 may be static or dynamic. A dynamic annotation 170 may operate as a function of data 165, other programs being executed on the processor cores 110, or other state information related to the computing architecture 100. For example, the dynamic annotation 170 may vary as a function of available energy, available memory, or available storage capacity. Annotations 170 may be generic to a class of devices or the annotation 170 may be unique to a particular instance of a device. For example, a unique annotation 170 may address the impact of silicon manufacturing variability for a particular device within the computing architecture 100. Similarly, energy consumption consideration may involve unique gate size or transistor size for particular components due to manufacturing variability. Specification of annotations 170 may also leverage other manufacturing and aging factors with respect to particular target components within the computing architecture 100.

Within a multiprocessor system, annotations 170 may specify preferred processor cores 110 among a plurality of available processor cores 110. Such preference may be particularly applicable where certain processor cores 110 have specific functionality, for example, graphics processing features. When the processor cores 110 are of the same type, annotations 170 may be used to indicate preferred processor cores 110 in terms of other tasks currently executing on the processor cores 110 or parameters such as temperature, status of the associated caches 115, or context switching time.

Annotations 170 may also indicate configurations for reconfigurable platforms. These configurations may be specified to support reduced energy consumption for particular computational operations. Setting of the annotations 1170 may attempt to reduce or minimize the sum of energy for communicating the annotations 170 and the energy consumed for the execution of the associated computation.

Figure 2:
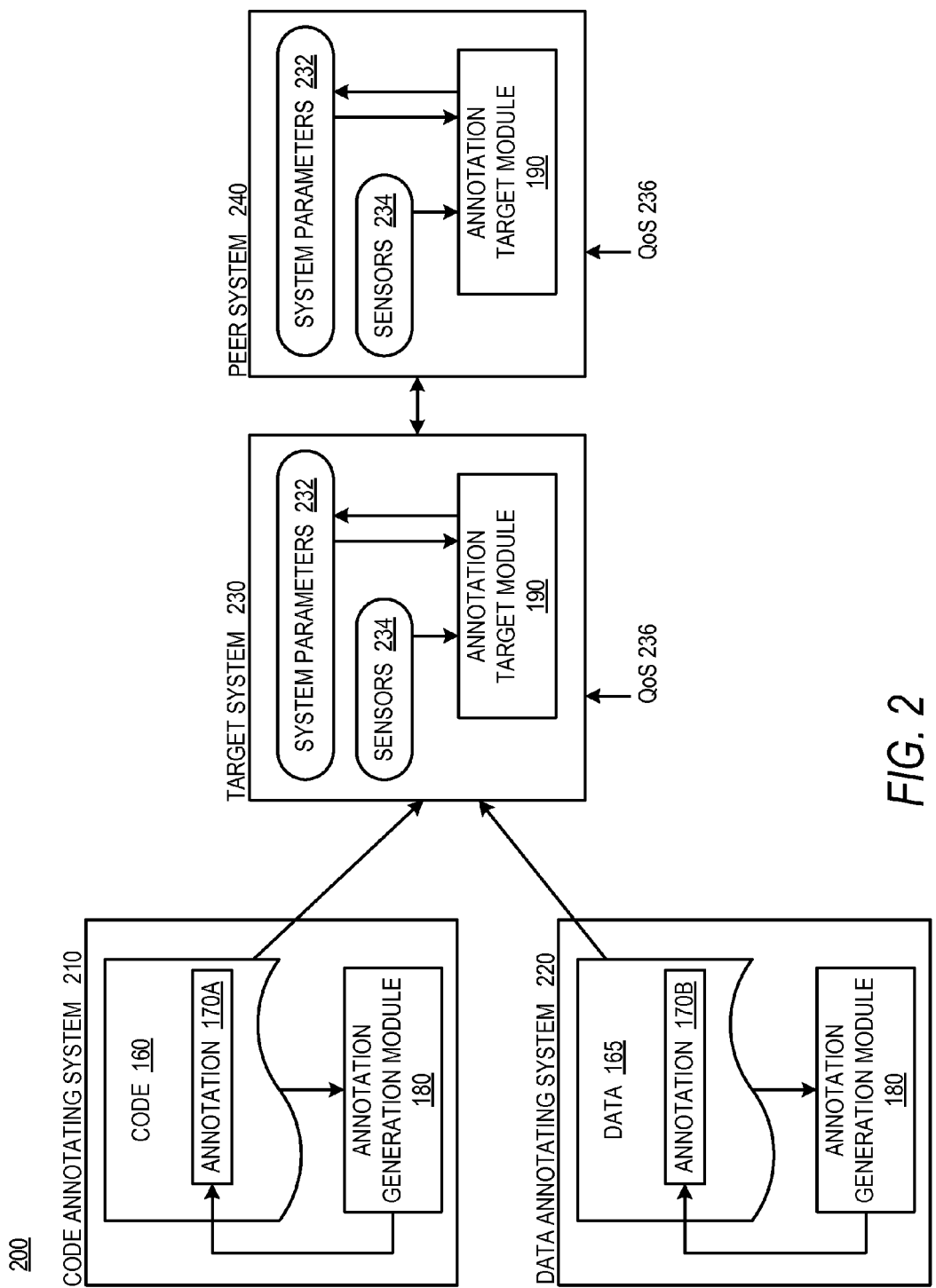
FIG. 2 is a block diagram illustrating a system for generating, distributing, and applying annotations to code and data.

FIG. 2 is a block diagram illustrating a system 200 for generating, distributing, and applying annotations 170 to code 160 and data 165, in accordance with at least some embodiment of the present disclosure. A code annotating system 210 may support operation of the annotation generation module 180 to apply a code annotation 170A to a block of code 160. The annotation generation module 180 may analyze the code 160 to determine which annotations 170 should be associated with the code 160. The code 160 and its associated annotation 170A may then be distributed to the target system 230 where the annotation 170A may be applied and the code 160 executed.

Analysis performed by the annotation generation module 180 at the code annotating system 210 may be conducted off-line prior to distribution to the target system 230, in real-time just as the code 165 is prepared for delivery to the target system 230, or in near real-time. The code annotating system 210 and the target system 230 may be the same type of computing architecture 100, or a different type of computing architecture 100. Where the code annotating system 210 and the target system 230 are differing types of computing architecture 100, the code annotating system 210 may use information about the target system 230 while determining the annotations 170. For example, if the code annotating system 210 is an application server and the target system a mobile handset, the code annotating system 210 may generate annotation 170 for the code 160 in consideration of the processors, display resolution, memory limitation, or power capacity of the target system 230.

A data annotating system 220 may support operation of the annotation generation module 180 to apply a data annotation 170B to a block of data 165. The annotation generation module 180 may analyze the data 165 to determine which annotations 170 should be associated with the data 165. The data 165 and its associated annotation 170B may then be distributed to the target system 230 where the annotation 170B may be applied and the system that will process the data 165. For example, the data 165 may be annotated to indicate bit width, bit rate or bit resolution to be used while processing the data. These bit resolutions may be determined using interval or affine arithmetic. The information determined for establishing the annotations 170 may be calculated using simulation, statistical analysis, or simulation augmented by statistical analysis. Evaluating the data 165 may involve directed search of a solution space. Establishing the annotations 170 may leverage prior annotations 170 established for identical or similar computational structures.

The data 165 and its associated annotation 170B may be distributed from the data annotating system 220 to the target system 230. Similarly, code 160 and its associated annotation 170A may be distributed from the code annotating system 210 to the target system 230. At the target system, an annotation target module 190 may apply the annotations to the target system 230 while executing the code 160, processing the data 165, or both. An annotation 170 may remain static throughout its use, or the annotation may be dynamic. A dynamic annotation 170 may change at the target system 230 as the code 160 is executed or the data 165 is processed. For example, an annotation 170 may be data dependent with respect to input data, intermediate variables, or output data. A dynamic annotation 170 may vary based on one or more system parameters 232 that provide state information of the target system 230. These system parameters may include available energy, storage capacity, or memory capacity. Similarly, a dynamic annotation 170 may vary based on one or more values obtained from sensors 234. These values from sensors 234 may include thermal data, position data, energy conditions, soft error rate, wireless channel characteristics, network link conditions, and so forth. A dynamic annotation 170 may vary with respect to other tasks that are simultaneously executed at the target system 230 along with the annotated computation.

Annotations 170 for two or more computational tasks may be merged so that an over all objective is accomplished. For example, the annotation 170 for each computational task may be presented using Pareto optimal solutions for a given amount of energy or a targeted level of QoS 236. For example, supply voltages and threshold voltages may be adjusted such that QoS 236 is maintained, real-time constraints are satisfied, and energy consumption is reduced or minimized. The QoS 236 may be provided to the target system 230 along with the code 160 or data 165. The QoS 236 may also be determined by the target system 230. The QoS 236 may be specified by a user at the target system 230. A user at the target system 230 may be provided the option for partial or complete manual overriding of the annotations 170. In addition to receiving annotations 170 from the code annotating system 210 and the data annotating system 220, the target system 230 may also generate its own annotations. The generation of annotations at the target system 230 may be referred to as self-annotation.

A peer system 240 may be considered another instance of a target system 230. The peer system 240 may receive its code 160, data 165, annotations 170, or any combination thereof from the target system 230 which may be considered a peer of the peer system 240. The peer system 240 may provide these elements to the target system as well. Multiple peer systems 240 may share annotations 170 with one another. Such sharing may be organized to communicate empirically derived annotations 170 or self-annotations 170. Peer systems 240 may share system set-ups, consumed energy levels, and obtained quality of service. A peer system 240 receiving multiple annotations 170 may use the best reported annotation 170, or may combine two or more reported annotations 170 into a new set of annotations 170.

Figure 3:
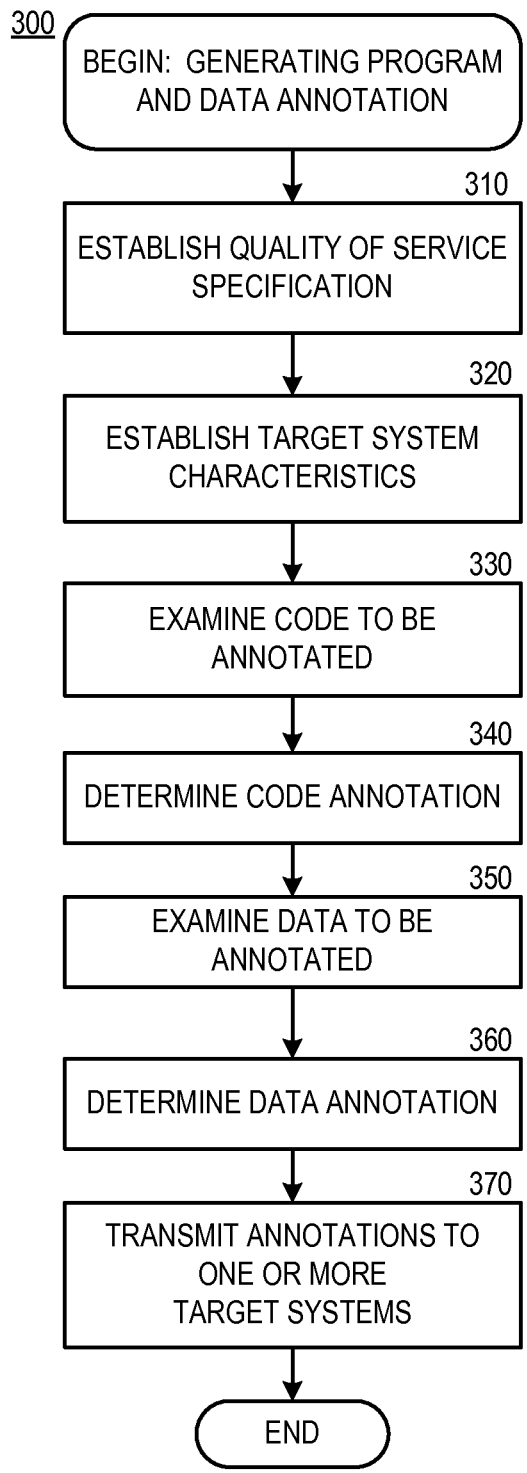
FIG. 3 is a flow diagram illustrating a process for generating program and data annotation.

Turning now to FIG. 3, additional details will be provided regarding the embodiments presented herein for program and data annotation for hardware customization and energy optimization. In particular, FIG. 3 is a flow diagram illustrating a process 300 for generating program and data annotation in accordance with at least some embodiments of the present disclosure.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

Process 300 may begin at operation 310, where a quality of service (QoS) 236 specification may be established. A desired QoS level may be used for establishing annotations 170 that seek to maintain the specified QoS level. Various QoS levels may be provided for different target systems 230. The QoS levels may be specified as intervals or periodic levels, a continuous range of levels, multiple discrete levels or a single global level. The QoS level may also remain undetermined or at a default value until a user QoS level is provided at the target system 230.

At operation 320, characteristics of a target system 230 may be established. These characteristics may be used in establishing annotations 170 geared towards specific target systems 230 or classes of target systems. For example, the presence of a particular application specific core 120 within a target system 230 may influence the annotations 170 provided that impact that application specific core 120.

At operation 330, the code 160 to be annotated may be examined. The code 160 may be examined using symbolic parsing of the code 160. The code 160 may be examined by observing empirical operation of the code 160. The code 160 may be examined through statistical analysis of the code 160. The code may also be associated with the operations of a known portion of other code 160.

At operation 340, a code annotation 170A may be determined for the code 160 examined in operation 330. The various options for examining the code 160 in operation 330 may inform the determination of annotations 170 to be associated with the code 160. Annotation may inform customization of the target system 230. The customization may be adaptive in nature. For example, the code 160 may be annotated to use more or fewer processor cores 110 depending on the complexity of the code 160 as determined by the examination of operation 330. As another example, if the code 160 is determined to make efficient use of an application specific core 120, an annotation 170 may be associated with the code 160 to gate the particular application specific core 120 into an operational state. As yet another example, annotations may be associated with a block of code 160 that gate blocks of memory 140 on or off depending upon the memory needs of the code 160 as determined by examination at operation 330.

At operation 350, data 165 to be annotated may be examined. At operation 360, a data annotation 170B may be determined for the data 165 examined in operation 350. At operation 370, annotations 170 may be transmitted to one or more target systems 230. The transmitted annotations 170 may include the code annotation 170A determined in operation 340 and the data annotation 170B determined in operation 360. The process 300 may terminate after operation 370.

Figure 4:
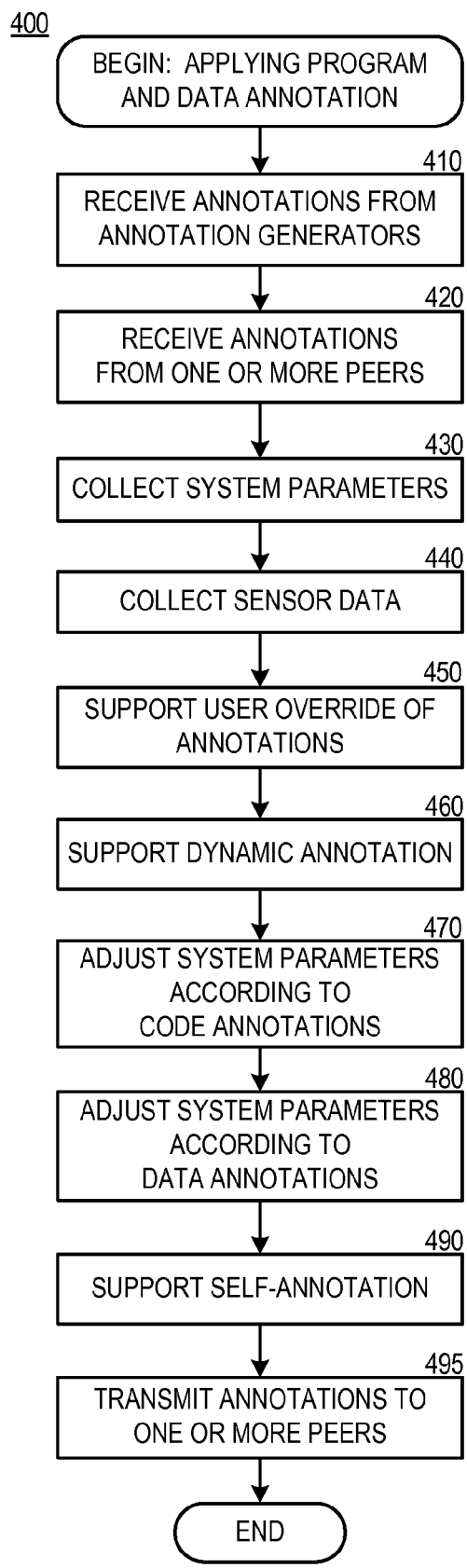
FIG. 4 is a flow diagram illustrating a process for applying program and data annotation, all arranged in accordance with at least some embodiments of the present disclosure.

Referring now to FIG. 4, additional details will be provided regarding the embodiments presented herein for program and data annotation for hardware customization and energy optimization. In particular, FIG. 4 is a flow diagram illustrating a process 400 for applying program and data annotation in accordance with at least some embodiments of the present disclosure.

Process 400 may begin at operation 410, where annotations 170 may be received from a code annotating system 210 or a data annotating system 220. At operation 420, annotations 170 maybe received from one or more peer systems 240.

At operation 430, system parameters 232 may be collected from the target system 230. At operation 440, data from various sensors 234 associated with the target system 230 may be collected. At operation 450, partial or complete override of the annotations 170 by a user may be supported.

At operation 460, dynamic annotation may be supported. Dynamic annotations 170 may operate as a function of data, other programs being executed on the processor cores 110, or other state information related to the target system 230. For example, a dynamic annotation 170 may vary as a function of available energy, available memory, or available storage capacity.

At operation 470, various system parameters 232 may be adjusted according to code annotations 170A. At operation 480, various system parameters 232 may be adjusted according to data annotations 170B. The adjustment of system parameters 232 at operation 470 and 480 apply the annotations to the target system 230. Such application may be supported by an annotation target module 190 operating in association with the target system 230. The application of annotations may inform customization of hardware or software associated with the target system 230. The customization may be adaptive in nature. For example, system parameters concerning gating, processor cores 110, application specific cores 120, memory 140, caches 115, and so forth may be set as suggested by the provided annotations 170.

At operation 490, self-annotation may be supported. Self-annotation may involve annotations 170 for a target system 230 being established at the target system 230 itself. For example, the annotation generating module 180 may execute at the target system 230 along with the annotation target module 190.

At operation 495, annotations 170 may be transmitted to one or more peer systems 240. The transmitted annotations 170 may be annotations 170 received from the code annotating system 210, the data annotating system 220, generated locally by dynamic annotation, or generated locally by self-annotation. The process 400 may terminate after operation 495.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A method to provide annotations to a target system to use to execute a code block, the method comprising:
    examining the code block to be annotated with one or more static annotations and one or more dynamic annotations, wherein the dynamic annotation changes at the target system during execution of the code block;
    specifying a quality of service level to execute the code block with a reduced energy expenditure, wherein the quality of service level is different from the reduced energy expenditure;
    while examining the code block to be annotated, determining a hardware customization to support the specified quality of service level;
    identifying annotations based, at least partially, upon the determined hardware customization and a system software configuration associated with a data block and that specifies how to process the data block when the code block is executed; and
    providing the identified annotations to the target system to cause the target system to:
        modify one or more of the identified annotations to vary the determined hardware customization as a function of available energy, available memory, or available storage capacity on the target system to obtain a varied hardware customization associated with the modified one or more annotations, and
        apply the one or more annotations at the target system during an execution of the code block at the target system using the varied hardware customization associated with the modified one or more annotations.

2. The method of claim 1, wherein the determined hardware customization comprises a specification of a particular processor core within a multiprocessor.

3. The method of claim 1, wherein the determined hardware customization comprises a specification of a cache replacement policy.

4. The method of claim 1, wherein the determined hardware customization comprises a gating of memory blocks.

5. The method of claim 1, wherein examining the code block comprises performing a symbolic analysis.

6. The method of claim 1, wherein examining the code block comprises performing an empirical observation of an execution of the code block.

7. The method of claim 1, wherein examining the code block comprises performing a statistical analysis.

8. The method of claim 1, wherein providing the identified one or more annotations to the target system comprises:
    compressing the identified one or more annotations to form one or more compressed annotations; and
    providing the one or more compressed annotations to the target system.

9. A method to provide annotations to a target system to use to execute a code block, the method comprising:
    examining the code block to be annotated;
    specifying a quality of service level to execute the code block with a reduced energy expenditure, wherein the quality of service level is different from the reduced energy expenditure;
    while examining the code block to be annotated, determining a hardware customization to support the specified quality of service level;
    identifying one or more annotations based, at least partially, upon the determined hardware customization; and
    providing the identified one or more annotations to the target system to cause the target system to:
        modify the identified one or more annotations to vary the determined hardware customization as a function of available energy, available memory, or available storage capacity on the target system to obtain a varied hardware customization associated with the modified one or more annotations, and
        execute the code block at the target system using the varied hardware customization associated with the modified one or more annotations;
    examining a data block to be annotated; and
    determining one or more annotations to be associated with the data block,
    wherein the determined hardware customization comprises a specification of a particular processor core within a multiprocessor,
    wherein the determined hardware customization further comprises a gating of memory blocks,
    wherein the determined one or more annotations to be associated with the data block include a set of annotations that specify a system software configuration associated with the data block and specify how to process the data block when the code block is executed, and wherein the target system comprises part of a peer system.

10. A method to apply annotations, the method comprising:
    receiving a first set of annotations that specify a hardware customization associated with data to be processed, wherein the specified hardware customization supports a quality of service level to process the data with a reduced energy expenditure, and wherein the quality of service level is different from the reduced energy expenditure;
    receiving a second set of annotations that specify a system software configuration associated with the data to be processed, wherein at least one of the first set of annotations or the second set of annotations comprises a dynamic annotation that changes as a code block associated with the dynamic annotation is executed;
    applying one or more annotations of the first set of annotations or the second set of annotations during an execution of the code block using the specified hardware customization from the received first set of annotations and the specified system software configuration from the received second set of annotations; and reducing energy expended to process the data through by use of the specified hardware customization and the specified system software configuration while maintaining the quality of service level, wherein the hardware customization is adaptive and wherein the system software configuration is associated with a data block, and wherein at least one of the one or more annotations specify how to process the data block when the code block is executed.

11. The method of claim 10, further comprising supporting a user override of at least one of the received first and second sets of annotations.

12. The method of claim 10, further comprising transmitting at least one of the first and second sets of annotations to a peer system.

13. The method of claim 10, further comprising:
dynamically adapting at least one of the received first and second sets of annotations to obtain modified annotations; and
instructing to be processed the data using a hardware customization associated with at least one of the modified annotations.

14. The method of claim 10, further comprising collecting sensor data to support environmental adaptation of at least one of the received first and second sets of annotations during execution of the code block.

15. The method of claim 10, wherein the second set of annotations comprise a first annotation specifying an operating system configuration and a second annotation specifying a compiler configuration.

16. A non-transitory computer storage medium having computer-executable instructions stored thereon that, in response to execution by a computer system, cause the computer system to:

instruct to process annotations that include a dynamic annotation received at a target system and that is associated with data to be processed by the target system, wherein the dynamic annotation changes at the target system as a code block that is associated with the dynamic annotation is executed, wherein the dynamic annotation varies as a function of at least one of an available energy, an available memory or an available storage capacity;

apply the processed annotations to at least one hardware component of the target system based on a hardware customization specified in the received annotations;

instruct to process the data using the hardware customization that is specified by the received annotations, wherein the specified hardware customization is based upon a specified quality of service level to process the data with a reduced energy expenditure, and wherein the quality of service level is different from the reduced energy expenditure;

instruct to modify at least one annotation of the processed annotations based on one or more values obtained from sensors at the target system;

apply the modified at least one annotation to the at least one hardware component of the target system at a time when the code block that is associated with the dynamic annotation is executed; and reduce energy expended to process the data while maintaining the quality of service level through use of the hardware customization specified in the received annotations and the at least one hardware component of the target system to which the modified at least one annotation was applied, wherein one or more of the annotations are based, at least in part, on a system software configuration that is associated with a data block and wherein the one or more annotations specify how to process the data block when the code block is executed.

17. The computer storage medium of claim 16, wherein the hardware customization comprises gating of unused memory blocks within the computer system, gating of cache memory within the computer system, and gating of processor cores within the computer system.

18. The computer storage medium of claim 16, wherein the hardware customization comprises modification of a supply voltage associated with the computer system.

19. The computer storage medium of claim 16, wherein the annotations, which are to be processed and which were received at the target system are obtained by the target system from a peer system.

20. The computer storage medium of claim 16, wherein the computer-executable instructions further include computer-executable instructions that, in response to execution by the computer system, cause the computer system to support self-annotation.

\* \* \* \* \*